US008515897B2

(12) United States Patent
Gao et al.

(10) Patent No.: US 8,515,897 B2
(45) Date of Patent: Aug. 20, 2013

(54) AUTOMATICALLY GENERATING REPORTS MATCHING USER INTERESTS REPRESENTED IN A DYNAMICALLY ADJUSTED USER INTEREST ANALYTIC MODEL

(75) Inventors: Xue F. Gao, Beijing (CN); Anh Q. Lu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 12/984,121

(22) Filed: Jan. 4, 2011

(65) Prior Publication Data

US 2012/0169713 A1 Jul. 5, 2012

(51) Int. Cl.
*G06F 17/30* (2006.01)
(52) U.S. Cl.
USPC .............................. 707/601; 707/600; 707/607
(58) Field of Classification Search
None
See application file for complete search history.

(56) References Cited

U.S. PATENT DOCUMENTS

| 2003/0187716 | A1* | 10/2003 | Lee ................................. 705/10 |
| 2003/0225769 | A1* | 12/2003 | Chkodrov et al. ............ 707/100 |
| 2008/0281915 | A1 | 11/2008 | Elad et al. |
| 2008/0294713 | A1 | 11/2008 | Saylor et al. |
| 2009/0172525 | A1 | 7/2009 | Mayor |

OTHER PUBLICATIONS

Zhang et al., Adapting OLAP Analysis to the User's Interest Through Virtual Cubes, L Wang et al. (Eds.): FSKD 2006, LNAI 4223, pp. 512-521, 2006. © Springer-Verlag Berlin Heidelberg 2006.
Garrigos et al., A Conceptual Modeling Approach for OLAP Personalization, A.H.F. Laender et al. (Eds.): ER 2009, LNCS 5829, pp. 401-414, 2009, © Springer-Verlag Berlin Heidelberg 2009.
Carsten Sapia, On Modeling and Predicting Query Behavior in OLAP Systems, Proceedings of the International Workshop on Design and Management of Data Warehouses (DMDW'99), Heidelberg, Germany, 14.-15.6.1999.
Sunita Sarawagi, User-adaptive exploration of multidimensional data, Proceedings of the 26th VLDB Conference, Cairo, Egypt, 2000, 10 pages.

* cited by examiner

*Primary Examiner* — Anteneh Girma
(74) *Attorney, Agent, or Firm* — Schmeiser, Olsen & Watts; John Pivnichny

(57) ABSTRACT

A method and program product for automatically generating reports matching user interests represented in a dynamically adjusted user interest analytic model (UIAM). A Multidimensional Expressions (MDX) query is generated based on a user visit to a business intelligence application. Based on initial user visit(s), a cube-based UIAM is constructed by including a representation of a first set of user interest(s) in a first set of UIAM item(s). The cube-based UIAM is transformed into a data warehouse-based UIAM. Based on subsequent user visit(s), UIAM items are updated to represent a second set of user interest(s) and UIAM item scores are adjusted to specify how frequently and recently user interests are indicated by the user visits. An update of data in the data warehouse is detected. Reports representative of user interest(s) represented by the updated UIAM items having the top k scores are generated.

25 Claims, 8 Drawing Sheets

AUTOMATICALLY GENERATING REPORTS MATCHING USER INTERESTS REPRESENTED IN A DYNAMICALLY ADJUSTED USER INTEREST ANALYTIC MODEL

TECHNICAL FIELD

The present invention relates to a data processing method and system for automatically generating and delivering reports that match user interests, and more particularly to a technique for generating and delivering reports matching user interests retrieved from queries that are changed for each user visit to a business intelligence application.

BACKGROUND

Although Business Intelligence (BI) applications are helping an increasing number of people to make decisions, running the BI applications to do business analysis often results in performance problems. Too much time and system resources are spent on the large amount of data in a data warehouse prepared for running a report. Further, because there are too many reports and data, an excessive amount of time and system resources are spent on analyzing and finding out information that has value. In known report delivery systems, users may log onto a portal and run reports and then analyze data in the reports, or a timer may be specified to run a specific report template at a scheduled time. Static pre-fetch technology such as Materialized Query Table is used for acceleration in a BI system, which is based on the assumption of data popularity and the pre-fetched data is always fixed summary data for specific metrics. Static pre-fetch technology is built along with the data warehouse schema and is not changed frequently, thereby leading to out-dated reports that do not match updated user interests (e.g., user interests that may change over period of time due to a user role change or market trend and other external factors). The aforementioned techniques are causing performance issues if there are many users logged onto the portal and running reports at the same time. Running reports at a specific scheduled time may also be slow because of the tendency to schedule reports to run at night. Thus, there exists a need to overcome at least one of the preceding deficiencies and limitations of the related art.

BRIEF SUMMARY

First embodiments of the present invention provide a computer-implemented method of automatically generating reports matching user interests represented in a dynamically adjusted user interest analytic model. The method comprises:

a computer system constructing a first user interest analytic model (cube-based UIAM) by including in a first set of one or more UIAM items a representation of a first set of one or more interests (first set of user interest(s)) of a user, the constructing the cube-based UIAM being based on one or more initial visits (initial user visit(s)) of the user to a business intelligence (BI) application;

the computer system storing the cube-based UIAM in a data structure that is an online analytical processing (OLAP) multidimensional cube;

the computer system transforming the cube-based UIAM stored in the cube into a second UIAM (data warehouse-based UIAM) stored in a data warehouse based on tables in the data warehouse;

the computer system storing the data warehouse-based UIAM in the tables in the data warehouse;

the computer system detecting one or more subsequent visits (subsequent user visit(s)) of the user to the BI application;

responsive to detecting the subsequent user visit(s), the computer system updating the cube-based UIAM and the data warehouse-based UIAM with a representation of a second set of one or more interests (second set of user interest(s)) of the user, wherein the second set of user interest(s) is different from the first set of user interest(s), wherein updating the cube-based UIAM and the data warehouse-based UIAM includes generating a second set of one or more UIAM items based on the subsequent user visit(s), and adjusting scores of multiple UIAM items that include the first set of one or more UIAM items and the second set of one or more UIAM items;

subsequent to updating the cube-based UIAM and the data warehouse-based UIAM, the computer system detecting an update of data in the data warehouse; and responsive to detecting the update of the data in the data warehouse, based on top k scores of the adjusted scores of the multiple UIAM items, and further based on the updated cube-based UIAM and the updated data warehouse-based UIAM, the computer system automatically generating one or more reports representative of user interest(s) in the first and second sets of user interest(s) corresponding to the top k scores instead of user interest(s) only in the first set of user interest(s), wherein k is a positive integer.

In one aspect of the first embodiments described above, adjusting the scores of the multiple UIAM items includes adjusting a score of a UIAM item of the second set of one or more UIAM items, the score of the UIAM item indicating a latest interest of the user. The step of adjusting the score includes:

the computer system adding M to a score of the UIAM item of the second set of one or more UIAM items if the UIAM item is already included in the cube-based UIAM;

the computer system adding the UIAM item of the second set of one or more UIAM items as a new record in the cube-based UIAM and assigning a default score of N as the score of the UIAM item if the UIAM item does not already exist in the cube-based UIAM; and the computer system subtracting W from score(s) of one or more other UIAM item of the multiple UIAM items in the cube-based UIAM, wherein the one or more other UIAM items are other than the UIAM item, wherein subtracting W from the score(s) of the one or more other UIAM items includes subtracting W from a score of at least one UIAM item of the first set of one or more UIAM items that is different from the UIAM item of the second set of one or more UIAM items.

A result of adjusting the score of the UIAM item of the second set of the one or more UIAM items is the score of the UIAM item being included in the top k scores. The step of automatically generating the one or more reports is based in part on the score of the UIAM item of the second set of one or more UIAM items being included in the top k scores.

In another aspect of the first embodiments described above, the method further comprises:

prior to constructing the cube-based UIAM, the computer system generating a first set of one or more Multidimensional Expressions (MDX) queries from the BI application based on the initial user visit(s), wherein constructing the cube-based UIAM is further based on information included in the first set of one or more MDX queries; and in response to detecting the subsequent user visit(s), generating a second set of one or more MDX queries, wherein generating the second set of one or more UIAM items based on the subsequent user visit(s) is further based on information included in the second set of one or more MDX queries.

A program product and a process for supporting computing infrastructure where the process provides at least one support service are also described and claimed herein, where the program product and the process correspond to the above-summarized method.

Second embodiments of the present invention provide a method of representing user interests in a cube-based user interest analytic model. The method comprises:

a computer system representing the user interests of a user with a specification of a sub-cube of a cube, an analysis of the sub-cube, user information, and user group information in the cube-based user interest analytic model (UIAM), wherein the sub-cube describes a data set associated with behavior of the user of a business intelligence (BI) application, the behavior indicating the user interests, wherein the specification of the sub-cube includes an axis of the cube, levels and member sets of the axis, calculations on the axis, an identification of the cube, and an analysis of properties for each pair of a metric in which the user is interested and a dimension in which the user is interested, wherein the properties include a maximum value of the metric in which the user is interested, a maximum deviation that indicates a significant deviation from an average of the metric in which the user is interested, a minimum value of the metric in which the user is interested, a deviation that is significant based on a comparison of metrics, and a specific data value set of the dimension, wherein the analysis of the sub-cube includes a data level change of the axis in the sub-cube that indicates the user has drilled up or drilled down from an axis to view additional detail or conclusion data, wherein the analysis of the sub-cube further includes a member set change of the axis in the sub-cube that indicates the user has used filters to filter out data in the cube, wherein the analysis of the sub-cube further includes calculation changes of axes of the cube that indicate the user has changed a calculation of the cube, wherein the user information includes a user identification that identifies the user based on a logon to the BI application by the user, and wherein the user group information includes a user group identification that identifies a group that includes the user who logged onto the BI application;

the computer system receiving a Multidimensional Expressions (MDX) query from the BI application based on a visit (user visit) of a user to the BI application;

the computer system extracting the specification of the sub-cube, the analysis of the sub-cube, the user information, and the user group information from the MDX query; and storing the specification of the sub-cube, the analysis of the sub-cube, the user information, and the user group information in the cube-based UIAM; and automatically generating one or more reports representative of interests of the user, the interests based on the cube-based UIAM.

Third embodiments of the present invention provide a method of representing user interests in a data warehouse-based user interest analytic model. The method comprises:

a computer system representing, in the data warehouse-based user interest analytic model (UIAM), the user interests with a fact table having fact table columns, a dimension table having dimension table columns, combinations of dimension table columns, combinations of fact table columns, an analysis of properties for pairs of columns, scores of UIAM items included in the data warehouse-based UIAM, and matching level values, wherein each pair of columns includes a fact table column of the fact table columns and a dimension table column of the dimension table columns, the user interests being interests of a user of a business intelligence (BI) application, wherein the fact table columns indicate the user interests, wherein the dimension table columns indicate metrics associated with the user interests, wherein the combinations of dimension table columns indicate other metrics associated with the user interests, wherein the combinations of fact table columns indicate a comparison among the metrics associated with the user interests, wherein properties for each pair of columns includes a maximum value of data in which the user is interested, a maximum deviation that indicates a significant deviation from an average of the data in which the user is interested, a minimum value of the data in which the user is interested, a deviation that is significant based on a comparison between two fact table columns of the fact table columns, and a specific data value set of the dimension table, wherein each score of the scores is assigned to a corresponding UIAM item of the UIAM items and indicates a level of interest of the user, the interest of the user being represented by the corresponding UIAM item, and the level of interest being dynamically adjusted based on visits to the BI application by the user, and wherein a matching level value of the matching level values for the metrics associated with the user interests indicates whether a user interest of the user interests of the user is common among other users included in a group that includes the user; and automatically generating one or more reports representative of the user interests as represented in the data warehouse-based UIAM.

Embodiments of the present invention provide a technique for generating reports that match user interests automatically in response to data being refreshed in a data warehouse. The generation of the reports uses a user (or user group) interest analytic model that represents each user's (or user group's) interests and habits. The user and user group interest analytic models may be implemented in a data warehouse and in a cube. The user interest analytic model and the user group interest analytic models may dynamically adjust based on a frequency of users' visits to a business intelligence application. The dynamic adjustment of the user interest analytic model and the user group interest analytic models allows for a representation of updated user interests that have changed over a period of time (e.g., due to a change in a user's role, a market trend, or other external factors) and provides up-to-date reports that match updated user interests.

DETAILED DESCRIPTION

1. Overview

Embodiments of the present invention provide a system and method to retrieve user interest information directly from Multidimensional Expressions (MDX) queries, where the user interest information may be changed for every user visit to a business intelligence (BI) application. The user interest information may be used to develop a User Interest Analytic Model (UIAM). A user may change her or his interests over time according to business needs. The changes in a user's interests may be provided by MDX queries. Embodiments of the present invention may also detect user group interest information (i.e., information about activities, interests, and habits of a group of users) using information retrieved from MDX queries. The user group interest information may be used to develop a User Group Interest Analytic Model (UGIAM).

Using the UIAM (or UGIAM), embodiments disclosed herein may generate reports matched with different user (or user group) interests immediately after data is refreshed (i.e., updated) in a data warehouse. Embodiments may also provide a report description. If a user is interested in one or more of the immediately generated reports, the user may open and view the report(s) and in response, one or more MDX queries are generated. The system disclosed herein may perform analysis on the MDX query and adjust the UIAM and/or UGIAM accordingly. If no user is interested in opening and viewing the immediately generated report(s), then the users ignore the immediately generated report(s) and run other reports they are interested in viewing. In response to running the other reports, another set of MDX queries is generated, the UIAM and/or UGIAM are adjusted accordingly, and new reports are generated.

Figure 1:
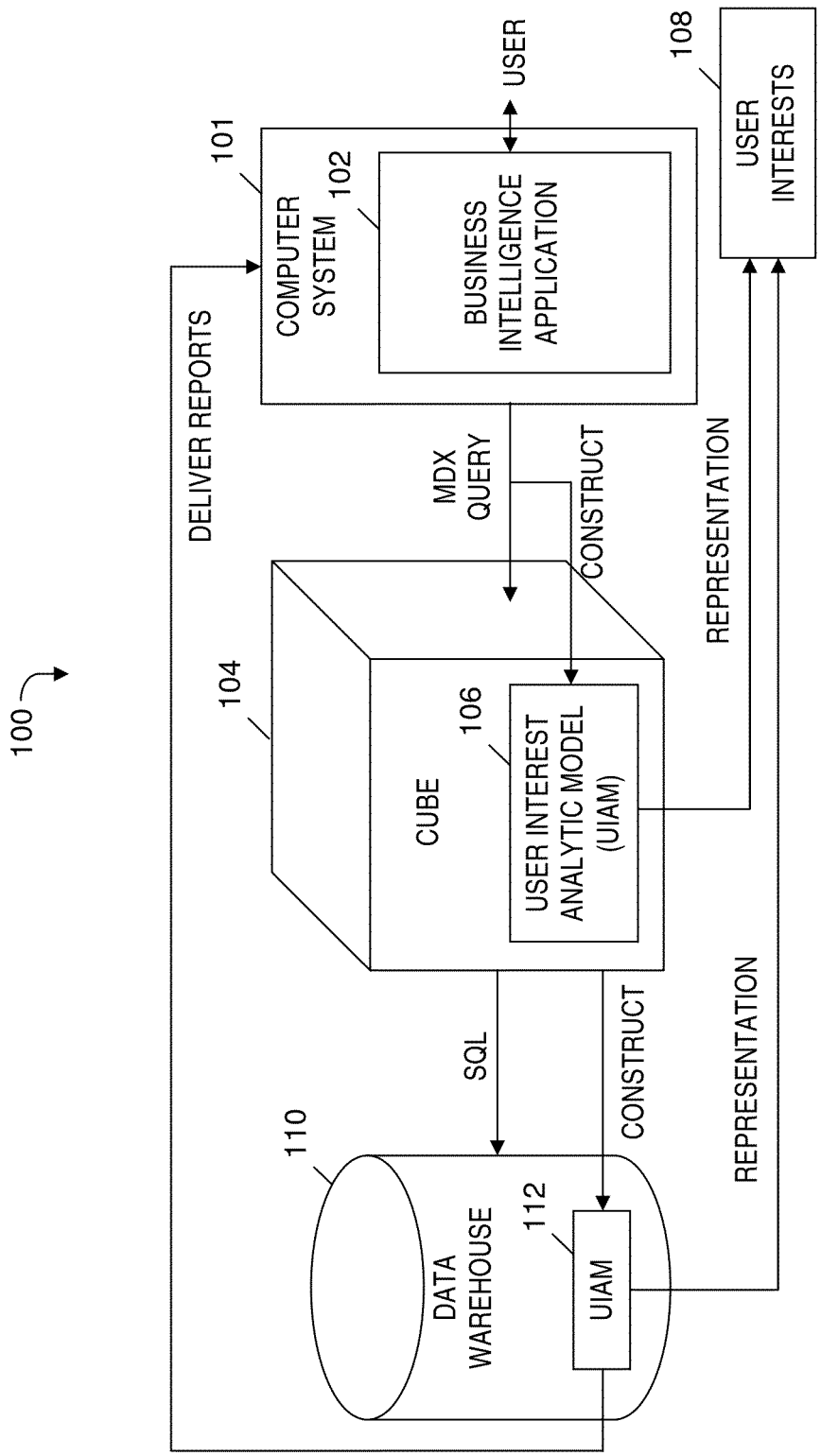
FIG. 1 is a block diagram of a system for automatically generating reports matching user interests represented in a dynamically adjusted user interest analytic model, in accordance with embodiments of the present invention.

2. System for Automatically Generating Reports Matching User Interests Represented in a UIAM FIG. 1 is a block diagram of a system for automatically generating reports matching user interests represented in a dynamically adjusted user interest analytic model, in accordance with embodiments of the present invention. System 100 includes a computer system 101 that runs a software-based BI application 102. System 100 also includes a multidimensional cube data structure 104 specified by online analytical processing (OLAP). Cube 104 includes a first (cube-based) UIAM 106 and may include a first (cube-based) UGIAM (not shown). UIAM 106 includes items (a.k.a. UIAM items) that represent user interests 108 (i.e., interests of a user who utilizes BI application 102). The cube-based UGIAM includes items (a.k.a. UGIAM items) that represent interests (a.k.a. user group interests) of a group of users of BI application 102.

Furthermore, system 100 includes a data warehouse 110 which includes a second (data warehouse-based) UIAM 112, which also includes UIAM items that represent user interests 108. Data warehouse 110 may also include a second (data warehouse-based) UGIAM (not shown) that includes UGIAM items that represent user group interests.

In response to users' visits to the BI application 102, the BI application 102 generates MDX queries that include information that is used to construct or update cube-based UIAM 106 to represent the user interests 108 that are indicated by the users' visits to the BI application. The information in the MDX queries may also be used to construct or update the cube-based UGIAM (not shown) to represent user group interests that are indicated by the users' visits to the BI application. As used herein, a user visit (a.k.a. user's visit) to an application is defined as a user accessing and viewing data (e.g., a report) provided by the application.

Data warehouse 110 receives information from cube 104 via a database computer language such as SQL. Cube-based UIAM 106 is transformed into data warehouse-based UIAM 112 by, for example, SQL statements. The cube-based UGIAM is transformed into the data warehouse-based UGIAM. The functionality of the components of system 100 is further described below with respect to the processes depicted in FIG. 2 and FIG. 3.

Figure 2:
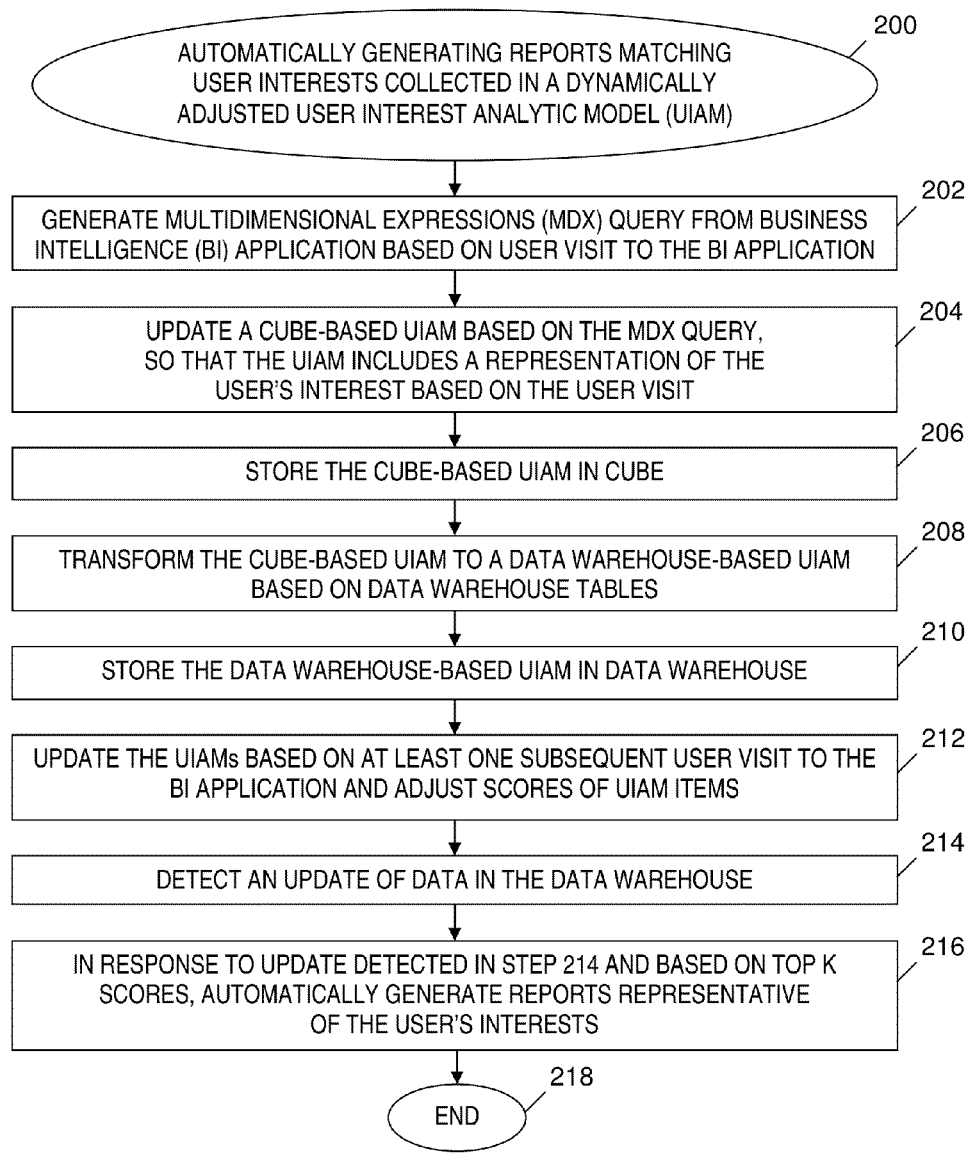
FIG. 2 is a flowchart of a process for automatically generating reports matching user interests represented in a dynamically adjusted user interest analytic model, where the process is implemented by the system of FIG. 1, in accordance with embodiments of the present invention.

3. Automatically Generating Reports Matching User Interests Represented in a UIAM FIG. 2 is a flowchart of a process for automatically generating reports matching user interests represented in a dynamically adjusted user interest analytic model, where the process is implemented by the system of FIG. 1, in accordance with embodiments of the present invention. The process of automatically generating reports matching user interests that are represented in a dynamically updated UIAM begins at step 200. Prior to step 202, a user visits BI application 102 (see FIG. 1). In step 202, BI application 102 (see FIG. 1) generates a first set of one or more MDX queries based on an initial set of one or more visits (a.k.a. initial user visit(s)) by the user to the BI application. Between steps 202 and 204, computer system 101 (see FIG. 1) extracts information from the MDX queries generated in step 202. The extracted information may be used to derive interests of the user based on the initial user visit(s) to the BI application.

In step 204, computer system 101 (see FIG. 1) constructs or updates UIAM 106 (see FIG. 1) by generating UIAM item(s) for the initial user visit(s), each initial user visit resulting in the generation of exactly one corresponding UIAM item. Also in step 204, the computer system 101 (see FIG. 1) inserts into UIAM 106 (see FIG. 1) the generated UIAM item(s) that represent the user's interests based on the initial user visit(s) to BI application 102 (see FIG. 1) and the information extracted from the MDX queries generated in step 202. Furthermore, each generated UIAM item includes a score that indicates how frequently and how recently the user demonstrated the user interest represented by the UIAM item. The discussion presented below relative to FIG. 3 includes details of how the UIAM is updated in step 204. In step 206, computer system 101 (see FIG. 1) stores UIAM 106 (see FIG. 1) in cube 104 (see FIG. 1).

In the UIAM 106 (see FIG. 1), the following items are included:

Metrics of interest: the metric in which the user is interested the most. For example, metrics of interest may include head count, hires count, etc.

Dimensions of interest associated with each metric of interest: Dimensions in which the user is most interested. For each metric of interest, there is a corresponding different dimension of interest. The dimensions of interest are a list of dimensions of interest for all metrics of interest.

Dimensions used in each metric: the dimensions used together most often for a particular metric of interest.

Metrics of interest comparison: identifies the metrics of interest most likely to be used in the same report so that the user may compare the identified metrics of interest.

For each pair of [Metric, Dimension], where Metric is a metric of interest and Dimension is a dimension of interest, the UIAM includes a detail data analysis of data properties of the metric of interest. The detail data analysis includes:

Maximum metric data: maximum value of data in which the user is interested. For example, maximum metric data may include a maximum head count number among different departments.

Maximum standard deviation: identifies a significant deviation from an average of the data in which the user is interested. For example, a maximum standard deviation is the head count number which is a significant deviation from the average head count.

Minimum metric data: a minimum value of the data in which the user is interested. For example, minimum metric data may include a minimum head count number among different departments.

Significant deviation from metrics comparison: a deviation that is significant based on a comparison between metrics of interest.

Specific dimension value set: a set of data values in a particular dimension.

The computer system 101 (see FIG. 1) assigns or adjusts a score for each of the UIAM items listed above. Each score indicates a level of user interest in the UIAM item to which the score is assigned. The level of user interest may indicate how frequently and/or how recently a user demonstrates the user interest (e.g., by accessing a particular report of the BI application 102 (see FIG. 1)). The scores are adjusted based on data collected in response to user visits to the BI application 102 (see FIG. 1). For example, the scores are adjusted based on information extracted from MDX queries that are generated in response to each user visit to the BI application. Each user visit to the BI application 102 (see FIG. 1) generates only one UIAM item and this UIAM item may be already existing in the UIAM or it may be a new UIAM item that does not already exist in the UIAM.

The computer system 101 (see FIG. 1) assigns a matching level value to each of the UIAM items listed above. The matching level assigned to a UIAM item indicates whether an interest of a user corresponding to the UIAM item is common among a group of users that includes the user.

In step 208, computer system 101 (see FIG. 1) transforms UIAM 106 (see FIG. 1) into UIAM 112 (see FIG. 1) based on data warehouse tables. In step 210, computer system 101 (see FIG. 1) stores UIAM 112 (see FIG. 1) in data warehouse 110 (see FIG. 1).

After step 210 and before step 212, computer system 101 (see FIG. 1) detects one or more subsequent visits by the user to the BI application 102 (see FIG. 1) (i.e., the user visits the BI application 102 (see FIG. 1) again one or more times) and in response to the subsequent user visit(s), a second set of one or more MDX queries is generated by the BI application. The subsequent user visit(s) are the basis for the generation of the second set of one or more MDX queries. The computer system 101 (see FIG. 1) extracts information from the second set of one or more MDX queries that indicates updated interests of the user. In step 212, computer system 101 (see FIG. 1) updates UIAM 106 (see FIG. 1) by generating one or more UIAM items that are based on the updated user interests indicated by the subsequent user visit(s) and the information extracted from the second set of one or more MDX queries. Furthermore, scores of the UIAM items in the UIAM 106 (see FIG. 1) are adjusted in step 212, where each adjusted score indicates how frequently and how recently the user interest indicated by the corresponding UIAM item has been demonstrated by the user visits, including the subsequent user visit(s). The discussion presented below relative to FIG. 3 includes details of how the UIAM is updated in step 212. The computer system 101 (see FIG. 1) may transform the updated UIAM 106 (see FIG. 1) to an updated UIAM 112 (see FIG. 1). The updated UIAM 112 (see FIG. 1) is also based on the updated user interests indicated by the subsequent user visit(s).

In step 214, computer system 101 (see FIG. 1) detects an update of data in data warehouse 110 (see FIG. 1). The update of data detected in step 214 is data from which report(s) may be derived, where the report(s) are representative of the aforementioned updated user interests.

In step 216, in response to the update detected in step 214 and based on the top k scores of the UIAM items in the updated UIAM 106 (see FIG. 1), computer system 101 (see FIG. 1) automatically generates report(s) representative of the user's interests, including the updated user interests based on the updated UIAM 106 (see FIG. 1) and/or the updated UIAM 112 (see FIG. 1), rather than report(s) that are representative of only user interests represented in the UIAM 106 (see FIG. 1) prior to the update in step 212. The value of k is a positive integer that is configurable (e.g., by an administrator of the computer system) and defined prior to step 216. The process of FIG. 2 ends at step 218.

4. Automatically Generating Reports Matching User Group Interests Represented in a UGIAM Although not shown in FIG. 2, steps analogous to the steps of the process depicted in FIG. 2 may automatically generate reports matching user group interests represented in a dynamically adjusted user group interest analytic model. The process of automatically generating reports matching user group interests represented in a UGIAM includes: (1) the computer system 101 (see FIG. 1) constructing and storing a UGIAM by including UIAM items associated with multiple users who utilize the BI application 102 (see FIG. 1) and belong to the same user group that groups users according to shared characteristics (e.g., shared roles), where the UIAM items are generated in step 204 (see FIG. 2); (2) computer system 101 (see FIG. 1) updating the UGIAM based on updates of the UIAM items (see step 212 in FIG. 2) associated with the multiple users belonging to the user group, where the updates of the UIAM items were based on the subsequent visits of the multiple users to the BI application; (3) computer system 101 (see FIG. 1) adjusting scores of the UIAM items based on the subsequent user visits; (4) the computer system 101 (see FIG. 1) determining matching levels of the UIAM items, each matching level indicating whether the user interest represented by the corresponding UIAM item is common among interests of the multiple users belonging to the user group according to predefined criteria; (5) the computer system 101 (see FIG. 1) automatically generating reports based on top K scores of the UIAM items in the updated UGIAM, where K is a configurable positive integer, and where K may be the same or different from the value of k described above relative to step 216 in FIG. 2; and (6) based on the matching levels, the computer system 101 (see FIG. 1) distributing the automatically generated reports to one or more users of the multiple users.

5. Creating and Adjusting the UIAM

Figure 3:
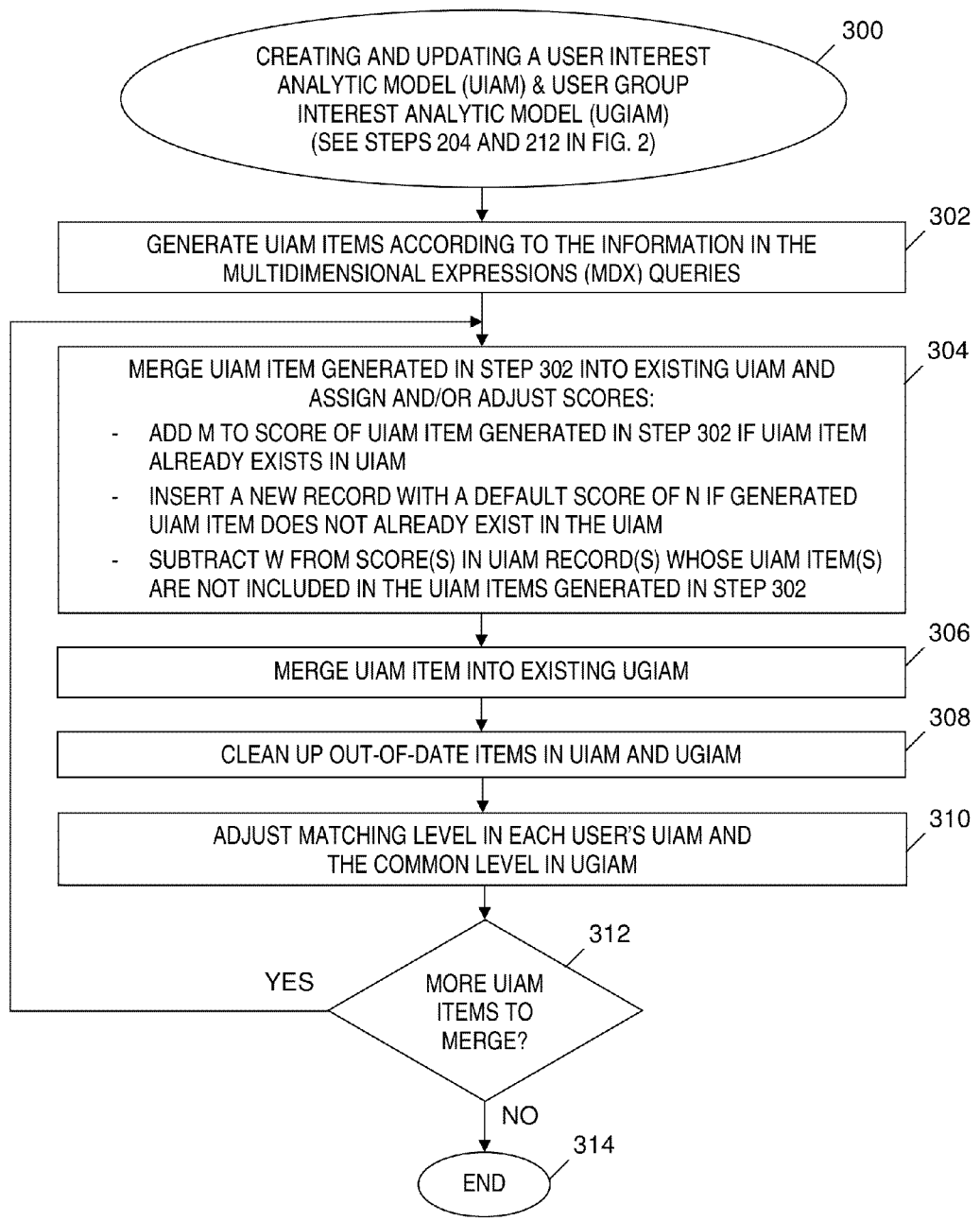
FIG. 3 is a flowchart of a process for creating and adjusting a user interest analytic model and a user group interest analytic model in the process of FIG. 2, in accordance with embodiments of the present invention.

FIG. 3 is a flowchart of a process for creating and adjusting a user interest analytic model and a user group interest analytic model in the process of FIG. 2, in accordance with embodiments of the present invention. The process for creating and adjusting (i.e., updating) a UIAM begins at step 300. In step 302, computer system 101 (see FIG. 1) generates UIAM items derived from information in MDX queries (i.e., the first set of one or more MDX queries generated in step 202 in FIG. 2 and the second set of one or more MDX queries generated between steps 210 and 212 in FIG. 2).

Step 304 begins a loop in the process of FIG. 3. In step 304, computer system 101 (see FIG. 1) merges into UIAM 106 (see FIG. 1) a first UIAM item of the UIAM items generated in step 302 (if step 304 is occurring in the first iteration of the aforementioned loop), or a next UIAM item of the UIAM items generated in step 302 (if step 304 is occurring in a subsequent iteration of the aforementioned loop). Step 304 also includes computer system 101 (see FIG. 1) assigning and/or adjusting a score of the UIAM item being merged. The score of the UIAM item may also be stored in UIAM 106 (see FIG. 1). If the UIAM item being merged already exists in UIAM 106 (see FIG. 1), then step 304 includes computer system 101 (see FIG. 1) adding the value M to the score of the UIAM item. If the UIAM item being merged does not already exist in UIAM 106 (see FIG. 1), then step 304 includes computer system 101 (see FIG. 1) inserting into UIAM 106 (see FIG. 1) a new record that includes a default score of the UIAM item, where the default score has a value of N. Step 304 also includes the computer system 101 (see FIG. 1) subtracting the value W from score(s) in existing records of UIAM 106 (see FIG. 1) whose UIAM item(s) are different from the UIAM item being merged. In one embodiment, the aforementioned scores are natural numbers. In one embodiment, the values of M, N and W used in step 304 are positive integers. In another embodiment, the values M, N and W are positive integers, where N>M and M>W. The M, N and W values may be configurable (e.g., by a system administrator).

It should be noted that the process of FIG. 3 assumes that system 100 (see FIG. 1) includes a (cube-based) UGIAM in cube 104 (see FIG. 1) and a UGIAM in data warehouse 110 (see FIG. 1). In step 306, computer system 101 (see FIG. 1) merges into the cube-based UGIAM the UIAM item and the score of the UIAM item determined in step 304. In step 308, computer system 101 (see FIG. 1) cleans up out-of-date items in the UIAM 106 (see FIG. 1) and the UGIAM. If the score of a UIAM item in UIAM 106 (see FIG. 1) becomes less than or equal to zero after the aforementioned subtraction of the W value, then the user's interest in the UIAM item is considered to be outdated and step 308 includes the computer system 101 (see FIG. 1) deleting the UIAM item from the cube-based UIAM 106 (see FIG. 1) (or indicating that the UIAM item is deactivated). The computer system also deletes the UIAM item whose score is less than or equal to zero from the cube-based UGIAM (or indicates that the UIAM item is deactivated in the UGIAM).

In step 310, computer system 101 (see FIG. 1) adjusts a matching level value of the UIAM item in the UIAM and a common level in the UGIAM. The matching level compared to a predefined threshold value indicates whether the user's interest indicated by the UIAM item is common among users who belong to the same user group as the user whose interest is indicated by the UIAM item.

In inquiry step 312, if computer system 101 (see FIG. 1) determines that at least one UIAM item generated in step 302 remains to be merged in the loop starting at step 304, then the process of FIG. 3 loops back to step 304, which processes the next UIAM item of the UIAM items generated in step 302. If computer system 101 (see FIG. 1) determines in step 312 that no UIAM items remain to be processed by the loop starting at step 304, then the process of FIG. 3 ends at step 314.

6. Generating a UIAM from a MDX Query

Figure 4:
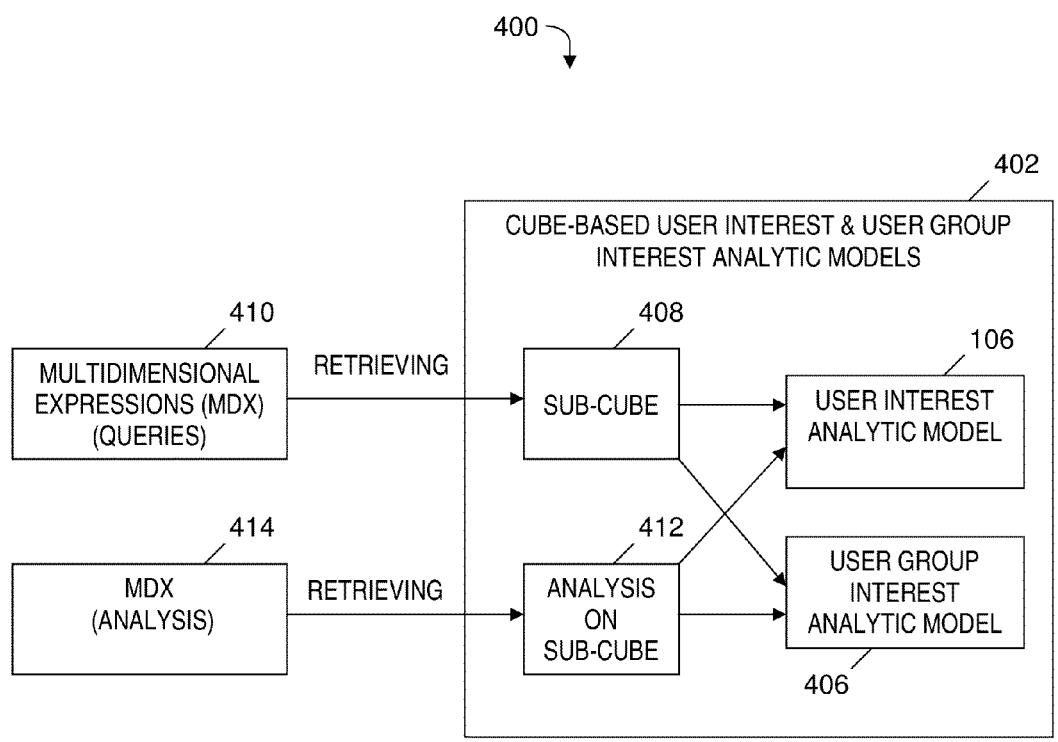
FIG. 4 depicts a process for generating a user interest analytic model from a Multidimensional Expressions query in the process of FIG. 2, in accordance with embodiments of the present invention.

FIG. 4 depicts a process for generating a user interest analytic model from a Multidimensional Expressions query in the process of FIG. 2, in accordance with embodiments of the present invention. Process 400 includes cube-based user interest and user group interest analytic models 402 that include UIAM 106 and UGIAM 406. Models 402 also include a sub-cube 408 that is specified by user interest information retrieved from MDX queries 410. Models 402 further include an analysis 412 that is performed on the sub-cube 408 after the user interest information is retrieved from the MDX queries 410. The analysis 412 retrieves user interest information from an MDX analysis 414, which is performed on the sub-cube specified by the information retrieved from the MDX queries 410. Computer system 101 (see FIG. 1) utilizes user interest information in sub-cube 408 and in the analysis on sub-cube 412 to generate UIAM 106 and to generate UGIAM 406.

7. Obtaining Information from MDX Query

The information extracted from the MDX queries generated in the process of FIG. 2 includes sub-cube, user, user group, metric and dimension related information. The sub-cube related information that describes a data set of user behavior that indicates user interests includes:

Axis of the cube identified in the MDX query

Levels and member set of the axis, where the level and member set is restricted in the MDX query Calculations performed on the axis Original cube (i.e., an identification of the cube on which the MDX query was performed)

Analysis of the aforementioned sub-cube related information includes:

Data level change of the axis in the sub-cube indicates the user has drilled up or drilled down from an axis to see more detail or conclusion data Member set change of the axis in the sub-cube indicates the user has used filters to filter out data in the cube Calculation changes for each axis indicates the user has changed the calculation of the cube Other same level sub-cube analysis The aforementioned user and user group information includes:

User identifier (ID) for the MDX query and analysis (e.g., user logon ID to log onto BI application 102 in FIG. 1)

User group ID for the MDX query and analysis (e.g., user group of the user who logged onto the BI application 102 in FIG. 1)

The computer system 101 (see FIG. 1) may also determine the frequency of data in the cube visited by users by using the aforementioned information extracted from the MDX queries generated in the process of FIG. 2.

8. Retrieving Information from MDX Query and Analysis

Figure 5:
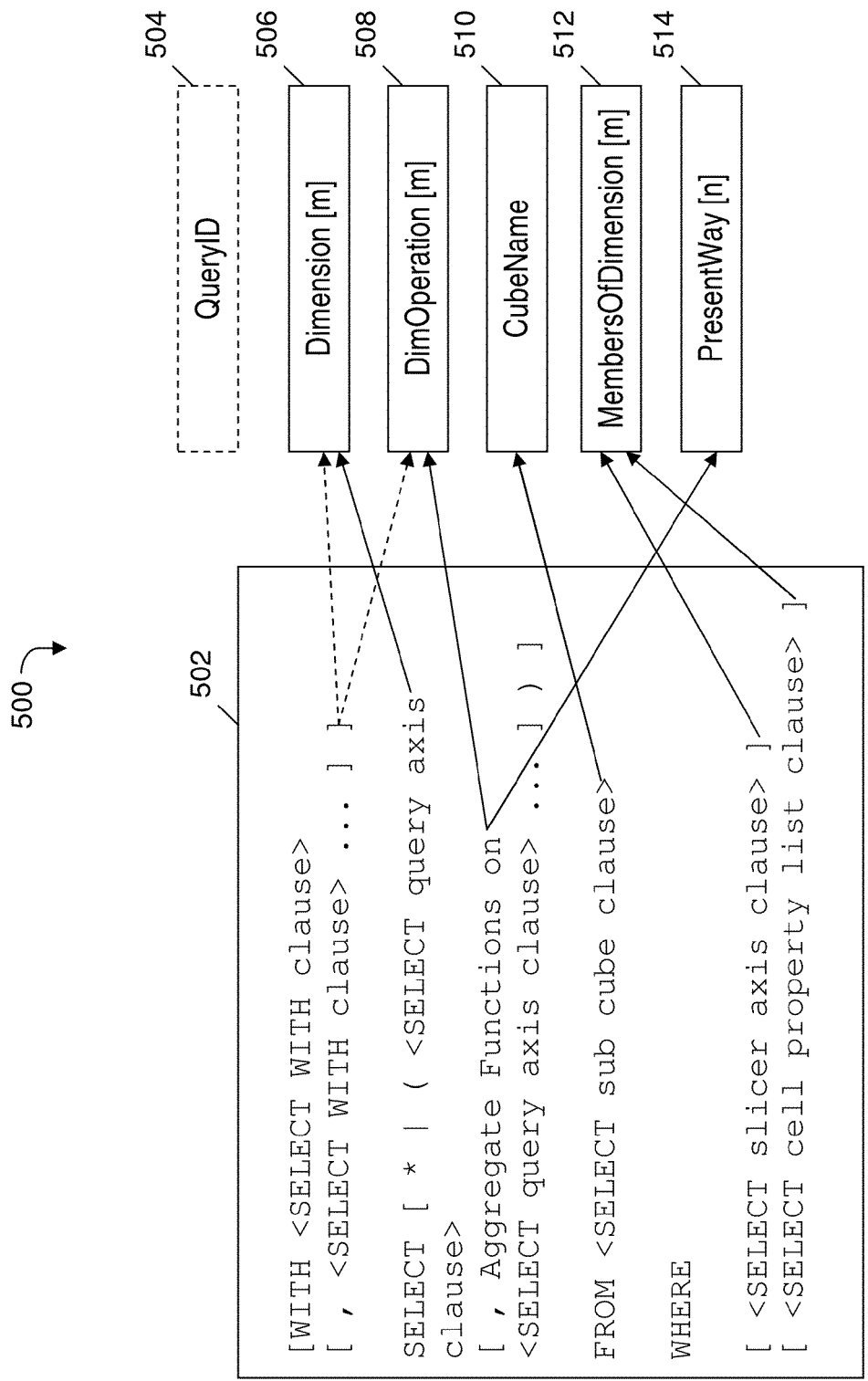
FIG. 5 is an example of obtaining information from a Multidimensional Expressions query in the process of FIG. 2, in accordance with embodiments of the present invention.

FIG. 5 is an example of retrieving information from a Multidimensional Expressions query in the process of FIG. 2, in accordance with embodiments of the present invention. Example 500 includes an example of a MDX query 502 generated in the process of FIG. 2 (e.g., in step 202 in FIG. 2), and items 504, 506, 508, 510, 512 and 514 in cube 104 (see FIG. 1) that are used to construct cube-based UIAM 106 (see FIG. 1). QueryID 504 identifies the MDX query 502. Dimension [m] 506 indicates the level of the axis of cube 104 (see FIG. 1) that is to be included in the sub-cube resulting from the MDX query 502. DimOperation [m] 508 (and other cube operations not shown, such as Sum( ) Ave( ) Operation Expression, etc.) indicate the operation performed on the axis. CubeName 510 identifies the cube that includes the resulting sub-cube. MembersOfDimension [m] 512 indicates the member collection on all the axes of the cube. PresentWay [n] 514 indicates how (e.g., by ordering and/or grouping) to present the data in the resulting sub-cube. For example, item 514 indicates an ordering by a particular dimension, a grouping by a particular dimension, topcount, topcount on a particular measure dimension, etc.

Figure 6:
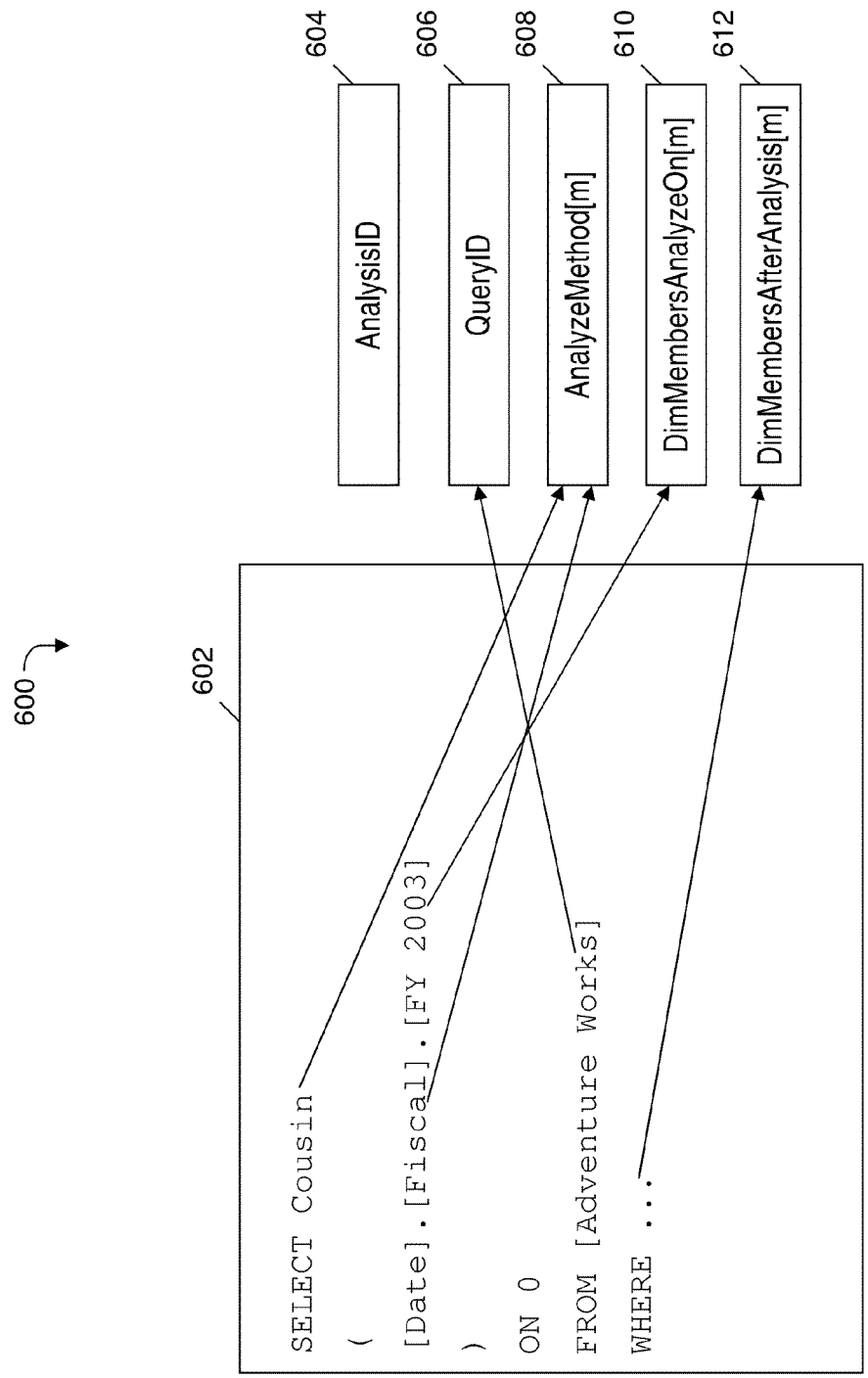
FIG. 6 is an example of obtaining information from a Multidimensional Expressions query based on a sub-cube in the process of FIG. 2, in accordance with embodiments of the present invention.

FIG. 6 is an example of retrieving information from a Multidimensional Expressions query based on a sub-cube in the process of FIG. 2, in accordance with embodiments of the present invention. Example 600 includes an example of a MDX query 602 generated in the process of FIG. 2 (e.g., in step 202 in FIG. 2), and items 604, 606, 608, 610 and 612 that are used to perform an analysis on a sub-cube retrieved from cube 104 (see FIG. 1) (i.e., as a result of an MDX query such as MDX query 502 in FIG. 5), and the result of the analysis on the sub-cube is used to construct cube-based UIAM 106 (see FIG. 1). AnalysisID 604 identifies the aforementioned analysis performed on the sub-cube. QueryID 606 identifies the sub-cube retrieved from cube 104 (see FIG. 1). AnalyzeMethod[m] 608 identifies the axis level on which the analysis is performed (e.g., on an upper level or a detail level of the axis dimension). DimMembersAnalyzeOn[m] 610 identifies members of the axis on which the analysis is performed. DimMembersAfterAnalysis[m] 612 indicates a new member collection on all the axes of the cube.

9. Data Warehouse-Based UIAM

In one embodiment, the cube 104 (see FIG. 1) may not be necessary, but the data warehouse 110 (see FIG. 1) is mandatory for a BI solution. For example, in Relational Online Analytical Processing (ROLAP) solutions, the cube is merely a meta-data description and the MDX query is transferred to SQL using an OLAP model. After the UIAM is constructed, it may be transferred to a model description in the data warehouse 110 (see FIG. 1) using an OLAP model.

In the data warehouse-based UIAM 112 (see FIG. 1), a description of a data set representing user behavior is provided by the following data collection from star-schema tables of the data warehouse:
Dimension table
Fact table and calculation of items in the fact table
Member collection at each level the dimension table
Levels of each dimension in the dimension table The following analyses are performed on the results of the above-listed data collection from star-schema tables of the data warehouse:
Member changes for each level of the dimension table
Level changes for each dimension
Calculation changes in each item of the fact table
Another star-schema linked to during analysis The UIAM 112 (see FIG. 1) based on tables of data warehouse 110 (see FIG. 1) includes the following UIAM items:
Fact table column indicating metrics of interest
Dimension table columns indicating each metric of interest
Dimension table columns indicating combinations of metrics of interest
Fact table columns indicating a comparison of combinations of metrics of interest Detail data analysis of metrics of interest of fact table data properties for each interested [Fact table column, Dimension table column] pair:
  a. Maximum data: maximum value of data in which the user is interested. For example, maximum metric data may include a maximum head count number among different departments.
  b. Maximum standard deviation: identifies a significant deviation from an average of the data in which the user is interested. For example, a maximum standard deviation is the head count number which is a significant deviation from the average head count.
  c. Minimum data: a minimum value of the data in which the user is interested. For example, minimum metric data may include a minimum head count number among different departments.
  d. Significant deviation from comparison between fact table columns: a deviation that is significant based on a comparison between fact table columns that identify metrics of interest.
  e. Specific dimension table data value set: a set of data values in a particular dimension of the dimension table.

The computer system 101 (see FIG. 1) assigns a score to each of the UIAM items listed above. Each score indicates a level of user interest in the UIAM item to which the score is assigned. The scores are adjusted based on data collected in response to user visits to the BI application 102 (see FIG. 1).

The computer system 101 (see FIG. 1) assigns a matching level value to each of the UIAM items listed above. The matching level assigned to a UIAM item indicates whether an interest of a user corresponding to the UIAM item is common among a group of users that includes the user.

All of the above-listed items except for the matching level are also included in a data warehouse-based UGIAM included in the data warehouse 110 (see FIG. 1).

Figure 7:
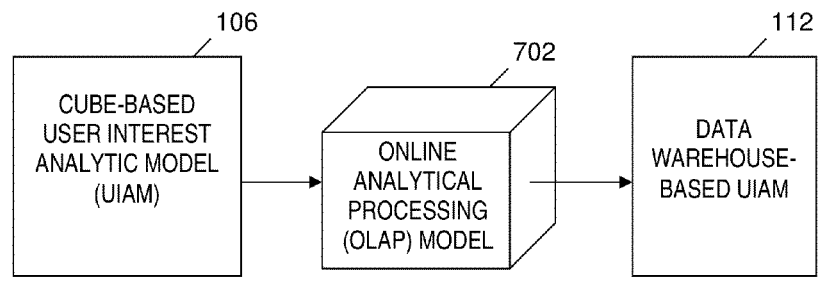
FIG. 7 is a flowchart of a process of generating a data warehouse-based user interest analytic model, in accordance with embodiments of the present invention.

FIG. 7 is a flowchart of a process of generating a data warehouse-based user interest analytic model, in accordance with embodiments of the present invention. A computer system transforms cube-based UIAM 106 to data warehouse-based UIAM 112 via an OLAP model 702.

10. Generating Immediate Reports

Figure 8:
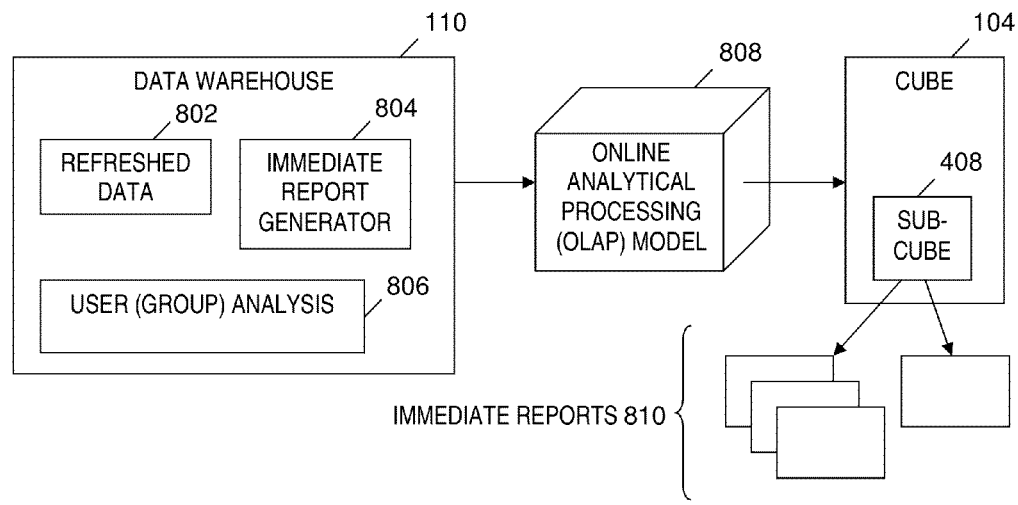
FIG. 8 is a flowchart of a process of generating reports in the process of FIG. 2, in accordance with embodiments of the present invention.

In response to data being refreshed in the data warehouse 110 (see FIG. 1), computer system 101 (see FIG. 1) immediately and automatically generates and displays links to reports that match with users' interests (see FIG. 8). The computer system also generates the data to populate the reports whose links are displayed. If the user has an interest in viewing the reports, he or she will open the links to view the reports. Because the reports already have data populated in them, the reports are opened and displayed quickly. Meanwhile, BI application 102 (see FIG. 1) generates another MDX query and sends the MDX query back to the cube 104 (see FIG. 1). The generated MDX query is used to update the UIAM to indicate the user's interest in viewing the reports. If the user ignores the displayed links to the reports, and instead views other reports or data from the reports server, then a new MDX query is generated and is used to adjust the cube-based UIAM and the data warehouse-based UIAM accordingly (i.e., to indicate the user's lack of interest in viewing the reports whose links were automatically generated and displayed, and to indicate the user's interest in viewing the other reports or data from the reports server).

FIG. 8 depicts a process of generating reports in the process of FIG. 2, in accordance with embodiments of the present invention. Data warehouse 110 includes refreshed data 802, an immediate report generator (IRG) 804, and user interest and user group interest analysis 806. In response to data being refreshed to become refreshed data 802, the IRG 804 is started and generates immediate reports based on analysis 806. Via OLAP model 808 and the sub-cube 408 included in cube 104, immediate reports 810 generated by IRG 804 are delivered to a user of BI application 102 (see FIG. 1).

The logic of the IRG 804 includes the following steps:
1. In response to data in data warehouse 110 (see FIG. 1) being refreshed to become refreshed data 802, the IRG 804 is started.
2. Based on the highest scores, IRG 804 selects the metrics of interest that most interest the user and the dimension that most interests the user, and relates the selected dimension to the selected metrics of interest.
3. The IRG 804 selects metrics of interest that are used together frequently by users in the same dimension (if such metrics of interest exist).
4. The IRG 804 calculates a report and checks the detail information of the data of the metrics of interest that users are most likely to visit
5. The IRG 804 generates the sub-cube and creates reports automatically matching the user interests.

Steps analogous to steps 1-5 listed above are performed for UGIAM reports generation.

11. Computer System

Figure 9:
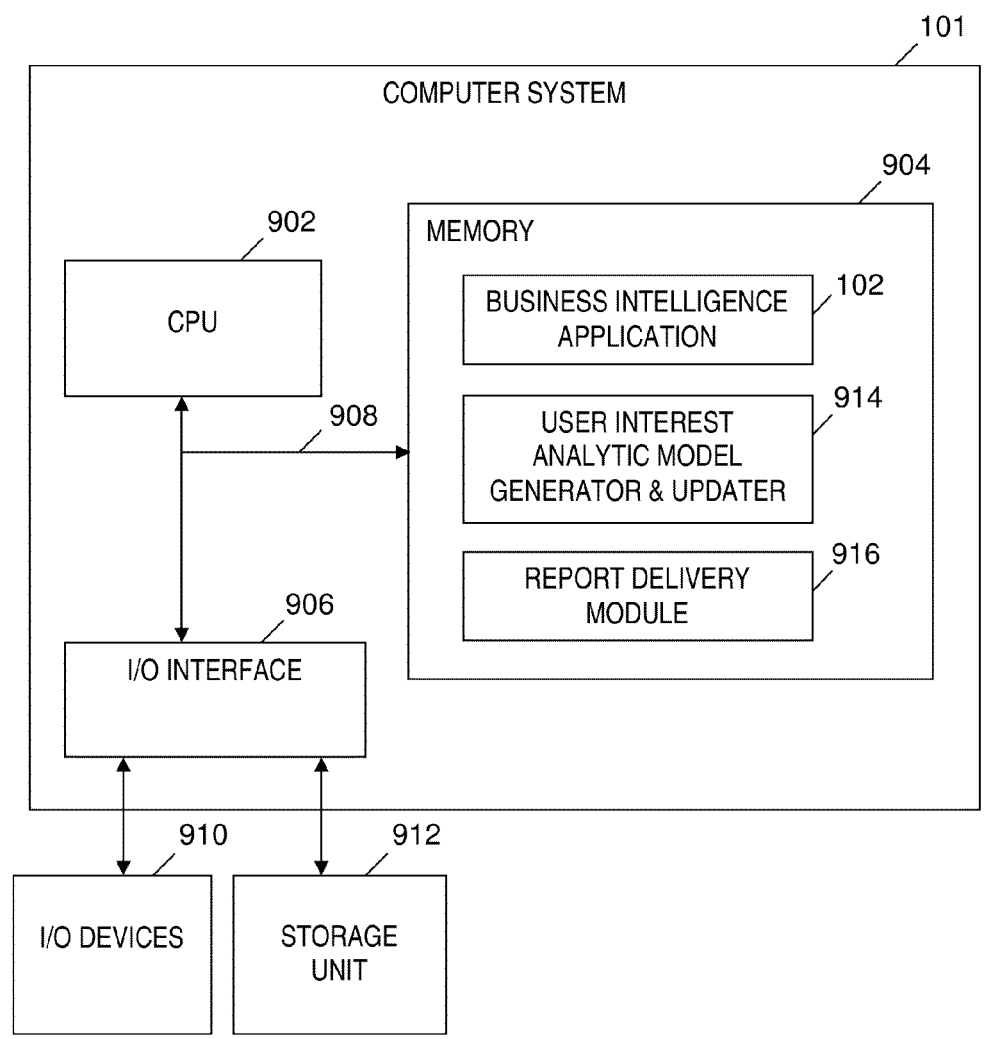
FIG. 9 is a block diagram of a computer system that is included in the system of FIG. 1 and that implements the process of FIG. 2, in accordance with embodiments of the present invention.

FIG. 9 is a block diagram of a computer system that is included in the system of FIG. 1 and that implements the process of FIG. 2, in accordance with embodiments of the present invention. Computer system 101 generally comprises a central processing unit (CPU) 902, a memory 904, an input/output (I/O) interface 906, and a bus 908. Further, computer system 101 is coupled to I/O devices 910 and a computer data storage unit 912. CPU 902 performs computation and control functions of computer system 101. CPU 902 may comprise a single processing unit, or be distributed across one or more processing units in one or more locations (e.g., on a client and server).

Memory 904 may comprise any known computer readable storage medium, which is described below. In one embodiment, cache memory elements of memory 904 provide temporary storage of at least some program code (e.g., program code 102, 914 and 916) in order to reduce the number of times code must be retrieved from bulk storage while instructions of the program code are carried out. Moreover, similar to CPU 902, memory 904 may reside at a single physical location, comprising one or more types of data storage, or be distributed across a plurality of physical systems in various forms. Further, memory 904 can include data distributed across, for example, a local area network (LAN) or a wide area network (WAN).

I/O interface 906 comprises any system for exchanging information to or from an external source. I/O devices 910 comprise any known type of external device, including a display device (e.g., monitor), keyboard, mouse, printer, speakers, handheld device, facsimile, etc. Bus 908 provides a communication link between each of the components in computer system 101, and may comprise any type of transmission link, including electrical, optical, wireless, etc.

I/O interface 906 also allows computer system 101 to store and retrieve information (e.g., data or program instructions such as program code 102, 914 and 916) from an auxiliary storage device such as computer data storage unit 912 or another computer data storage unit (not shown). Computer data storage unit 912 may comprise any known computer readable storage medium, which is described below. For example, computer data storage unit 912 may be a non-volatile data storage device, such as a magnetic disk drive (i.e., hard disk drive) or an optical disc drive (e.g., a CD-ROM drive which receives a CD-ROM disk).

Memory 904 may store computer program code 102, 914 and 916 that provides the logic for representing user interests in a dynamically adjusted cube-based and/or data warehouse-based UIAM, representing user group interests in a dynamically adjusted cube-based and/or data warehouse-based UGIAM, and automatically generating reports matching user interests represented in a dynamically adjusted UIAM and/or matching user group interests represented in a dynamically adjusted UGIAM.

Carrying out the instructions in user interest analytic model generator & updater 914 may perform steps 204 and 212 (see FIG. 2), the merging of UIAM items into existing UIAM and UGIAM in steps 304 and 306 (see FIG. 3), the cleaning up outdated items in UIAM and UGIAM in step 306 (see FIG. 3), the process depicted in FIG. 4 and the process depicted in FIG. 7. Running report delivery module 916 may deliver the immediate reports 810 (see FIG. 8) to user(s) of BI application 102. Further, memory 904 may include other systems not shown in FIG. 9, such as an operating system (e.g., Linux) that runs on CPU 902 and provides control of various components within and/or connected to computer system 101.

Storage unit 912 and/or one or more other computer data storage units (not shown) that are coupled to computer system 101 may store the cube 104 (see FIG. 1) and/or the data warehouse 110 (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer readable medium(s) (e.g., memory 904 and/or computer data storage unit 912) having computer readable program code (e.g., program code 102, 914 and 916) embodied or stored thereon.

Any combination of one or more computer readable medium(s) (e.g., memory 904 and computer data storage unit 912) may be utilized. The computer readable medium may be a computer readable signal medium or a computer readable storage medium. In one embodiment the computer readable storage medium is a computer readable storage device or computer readable storage apparatus. A computer readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program (e.g., program 102, 914 and 916) for use by or in connection with a system, apparatus, or device for carrying out instructions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code 102, 914 and 916) embodied on a computer readable medium may be transmitted using any appropriate medium, including but not limited to wireless, wireline, optical fiber cable, RF, etc., or any suitable combination of the foregoing.

Computer program code (e.g., program code 102, 914 and 916) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 101 or another computer system (not shown) having components analogous to the components of computer system 101 included in FIG. 9. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2 and FIG. 3) and/or block diagrams of methods, apparatus (systems) (e.g., FIG. 1, FIG. 4, FIG. 7, FIG. 8 and FIG. 9), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 102, 914 and 916). These computer program instructions may be provided to a processor (e.g., CPU 902) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., memory 904 or computer data storage unit 912) that can direct a computer (e.g., computer system 101), other programmable data processing apparatus, or other devices to function in a particular manner, such that the instructions (e.g., program 102, 914 and 916) stored in the computer readable medium produce an article of manufacture including instructions which implement the function/act specified in the flowchart and/or block diagram block or blocks.

The computer program instructions may also be loaded onto a computer (e.g., computer system 101), other programmable data processing apparatus, or other devices to cause a series of operational steps to be performed on the computer, other programmable apparatus, or other devices to produce a computer implemented process such that the instructions (e.g., program 102, 914 and 916) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the processes of representing user interests in a dynamically adjusted cube-based and/or data warehouse-based UIAM, representing user group interests in a dynamically adjusted cube-based and/or data warehouse-based UGIAM, and automatically generating reports matching user interests represented in a dynamically adjusted UIAM and/or matching user group interests represented in a dynamically adjusted UGIAM. Thus, an embodiment of the present invention discloses a process for supporting computer infrastructure, wherein the process comprises providing at least one support service for at least one of integrating, hosting, maintaining and deploying computer-readable code (e.g., program code 102, 914 and 916) in a computer system (e.g., computer system 101) comprising a processor, wherein the processor carries out instructions contained in the code causing the computer system to perform a method of representing user interests in a dynamically adjusted cube-based and/or data warehouse-based UIAM, representing user group interests in a dynamically adjusted cube-based and/or data warehouse-based UGIAM, and automatically generating reports matching user interests represented in a dynamically adjusted UIAM and/or matching user group interests represented in a dynamically adjusted UGIAM.

In another embodiment, the invention provides a method that performs the process steps of the invention on a subscription, advertising and/or fee basis. That is, a service provider, such as a Solution Integrator, can offer to create, maintain, support, etc. a process of representing user interests in a dynamically adjusted cube-based and/or data warehouse-based UIAM, representing user group interests in a dynamically adjusted cube-based and/or data warehouse-based UGIAM, and automatically generating reports matching user interests represented in a dynamically adjusted UIAM and/or matching user group interests represented in a dynamically adjusted UGIAM. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2 and FIG. 3 and the block diagrams in FIG. 1, FIG. 4, FIG. 7, FIG. 8 and FIG. 9 illustrate the architecture, functionality, and operation of possible implementations of systems, methods, and computer program products according to various embodiments of the present invention. In this regard, each block in the flowchart or block diagrams may represent a module, segment, or portion of code (e.g., program code 102, 914 and 916), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of automatically generating reports matching user interests represented in a dynamically adjusted user interest analytic model, said method comprising:

a computer system constructing a first user interest analytic model (cube-based UIAM) by including in a first set of one or more UIAM items a representation of a first set of one or more interests (first set of user interest(s)) of a user, said constructing said cube-based UIAM being based on one or more initial visits (initial user visit(s)) of said user to a business intelligence (BI) application;

said computer system storing said cube-based UIAM in a data structure that is an online analytical processing (OLAP) multidimensional cube;

said computer system transforming said cube-based UIAM stored in said cube into a second UIAM (data warehouse-based UIAM) stored in a data warehouse based on tables in said data warehouse;

said computer system storing said data warehouse-based UIAM in said tables in said data warehouse;

said computer system detecting one or more subsequent visits (subsequent user visit(s)) of said user to said BI application;

responsive to said detecting said subsequent user visit(s), said computer system updating said cube-based UIAM and said data warehouse-based UIAM with a representation of a second set of one or more interests (second set of user interest(s)) of said user, wherein said second set of user interest(s) is different from said first set of user interest(s), wherein said updating said cube-based UIAM and said data warehouse-based UIAM includes generating a second set of one or more UIAM items based on said subsequent user visit(s), and adjusting scores of multiple UIAM items that include said first set of one or more UIAM items and said second set of one or more UIAM items;

subsequent to said updating said cube-based UIAM and said data warehouse-based UIAM, said computer system detecting an update of data in said data warehouse; and responsive to said detecting said update of said data in said data warehouse, based on top k scores of said adjusted scores of said multiple UIAM items, and further based on said updated cube-based UIAM and said updated data warehouse-based UIAM, said computer system automatically generating one or more reports representative of user interest(s) in said first and second sets of user interest(s) corresponding to said top k scores instead of user interest(s) only in said first set of user interest(s), wherein k is a positive integer.

2. The method of claim 1, wherein said adjusting said scores of said multiple UIAM items includes adjusting a score of a UIAM item of said second set of one or more UIAM items, said score of said UIAM item indicating a latest interest of said user, wherein said adjusting said score includes:

said computer system adding M to a score of said UIAM item of said second set of one or more UIAM items if said UIAM item is already included in said cube-based UIAM;

said computer system adding said UIAM item of said second set of one or more UIAM items as a new record in said cube-based UIAM and assigning a default score of N as said score of said UIAM item if said UIAM item does not already exist in said cube-based UIAM; and said computer system subtracting W from score(s) of one or more other UIAM item of said multiple UIAM items in said cube-based UIAM, wherein said one or more other UIAM items are other than said UIAM item, wherein said subtracting W from said score(s) of said one or more other UIAM items includes subtracting W from a score of at least one UIAM item of said first set of one or more UIAM items that is different from said UIAM item of said second set of one or more UIAM items, wherein a result of said adjusting said score of said UIAM item of said second set of said one or more UIAM items is said score of said UIAM item being included in said top k scores, and wherein said automatically generating said one or more reports is based in part on said score of said UIAM item of said second set of one or more UIAM items being included in said top k scores.

3. The method of claim 2, further comprising:

determining a score of another UIAM item of said one or more other UIAM items is a predetermined value indicating an outdated UIAM item that represents an outdated interest of said user; and in response to said determining said score of said another UIAM item of said one or more other UIAM items is said predetermined value indicating said outdated UIAM item, said computer system deleting said another UIAM item of said one or more other UIAM items from said cube-based UIAM.

4. The method of claim 2, wherein said M, N and W are positive integers, wherein N>M, and wherein M>W.

5. The method of claim 1, further comprising:

prior to said constructing said cube-based UIAM, said computer system generating a first set of one or more Multidimensional Expressions (MDX) queries from said BI application based on said initial user visit(s), wherein said constructing said cube-based UIAM is further based on information included in said first set of one or more MDX queries; and in response to said detecting said subsequent user visit(s), generating a second set of one or more MDX queries, wherein said generating said second set of one or more UIAM items based on said subsequent user visit(s) is further based on information included in said second set of one or more MDX queries.

6. The method of claim 1, further comprising:

subsequent to said automatically generating one or more reports representative of said user interest(s) in said first and second sets of user interest(s) corresponding to said top k scores instead of user interest(s) only in said first set of user interest(s), said computer system receiving a selection by said user of a report of said one or more reports, said report associated with a UIAM item of said multiple UIAM items included in said updated cube-based UIAM;

based on said receiving said selection of said report, said computer system generating a MDX query based on said selection of said report; and responsive to said generating said MDX query, said computer system updating said cube-based UIAM again by adding M to said score of said UIAM item of said multiple UIAM items and subtracting W from one or more scores of one or more UIAM items of said multiple UIAM items that are other than said UIAM item.

7. The method of claim 1, further comprising:

subsequent to said automatically generating one or more reports representative of said user interest(s) in said first and second sets of user interest(s) corresponding to said top k scores instead of user interest(s) only in said first set of user interest(s), said computer system receiving a selection by said user of another report not included in said one or more reports;

based on said receiving said selection of said another report, said computer system generating a MDX query based on said selection of said another report; and responsive to said generating said another MDX query, said computer system updating said cube-based UIAM by adding M to a score of a UIAM item representing an interest of said user in said report if said UIAM item is already in said cube-based UIAM or assigning a default score of N to said UIAM item if said UIAM item is not already in said cube-based UIAM, and by subtracting W from score(s) of one or more UIAM items of said multiple UIAM items that are different from said UIAM item.

8. The method of claim 1, further comprising:

said computer system constructing and storing a user group interest analytic model (UGIAM) by including UIAM items associated with multiple users who utilize said BI application and belong to a user group, said UIAM items based on initial visits of said multiple users to said BI application, wherein said multiple users includes said user, and wherein said UIAM items include said first set of one or more UIAM items;

said computer system updating said UGIAM based on updates of said UIAM items associated with said multiple users belonging to said user group, said updates of said UIAM items based on subsequent visits of said multiple users to said BI application, wherein said updating said UGIAM includes adjusting scores of said UIAM items associated with said multiple users belonging to said user group; and said computer system automatically generating reports based on top K scores of said adjusted scores of said UIAM items associated with said multiple users belonging to said user group, wherein K is a positive integer.

9. The method of claim 8, further comprising:

said computer system determining matching levels of said UIAM items, each matching level indicating whether an interest represented by a corresponding UIAM item of said UIAM items is common among interests of said multiple users belonging to said user group according to predefined criteria; and said computer system distributing said generated reports to one or more users of said multiple users, said distributing based on said matching levels.

10. A computer program product, comprising a computer readable storage device that is not a transitory propagating signal, said computer readable storage device having a computer readable program code stored therein, said computer readable program code containing instructions that are carried out by a processor of a computer system to implement a method of automatically generating reports matching user interests represented in a dynamically adjusted user interest analytic model, said method comprising:

constructing a first user interest analytic model (cube-based UIAM) by including in a first set of one or more UIAM items a representation of a first set of one or more interests (first set of user interest(s)) of a user, said constructing said cube-based UIAM being based on one or more initial visits (initial user visit(s)) of said user to a business intelligence (BI) application;

storing said cube-based UIAM in a data structure that is an online analytical processing (OLAP) multidimensional cube;

transforming said cube-based UIAM stored in said cube into a second UIAM (data warehouse-based UIAM) stored in a data warehouse based on tables in said data warehouse;

storing said data warehouse-based UIAM in said tables in said data warehouse;

detecting one or more subsequent visits (subsequent user visit(s)) of said user to said BI application;

responsive to said detecting said subsequent user visit(s), updating said cube-based UIAM and said data warehouse-based UIAM with a representation of a second set of one or more interests (second set of user interest(s)) of said user, wherein said second set of user interest(s) is different from said first set of user interest(s), wherein said updating said cube-based UIAM and said data warehouse-based UIAM includes generating a second set of one or more UIAM items based on said subsequent user visit(s), and adjusting scores of multiple UIAM items that include said first set of one or more UIAM items and said second set of one or more UIAM items;

subsequent to said updating said cube-based UIAM and said data warehouse-based UIAM, detecting an update of data in said data warehouse; and responsive to said detecting said update of said data in said data warehouse, based on top k scores of said adjusted scores of said multiple UIAM items, and further based on said updated cube-based UIAM and said updated data warehouse-based UIAM, automatically generating one or more reports representative of user interest(s) in said first and second sets of user interest(s) corresponding to said top k scores instead of user interest(s) only in said first set of user interest(s), wherein k is a positive integer.

11. The program product of claim 10, wherein said adjusting said scores of said multiple UIAM items includes adjusting a score of a UIAM item of said second set of one or more UIAM items, said score of said UIAM item indicating a latest interest of said user, wherein said adjusting said score includes:

adding M to a score of said UIAM item of said second set of one or more UIAM items if said UIAM item is already included in said cube-based UIAM;

adding said UIAM item of said second set of one or more UIAM items as a new record in said cube-based UIAM and assigning a default score of N as said score of said UIAM item if said UIAM item does not already exist in said cube-based UIAM; and subtracting W from score(s) of one or more other UIAM item of said multiple UIAM items in said cube-based UIAM, wherein said one or more other UIAM items are other than said UIAM item, wherein said subtracting W from said score(s) of said one or more other UIAM items includes subtracting W from a score of at least one UIAM item of said first set of one or more UIAM items that is different from said UIAM item of said second set of one or more UIAM items, wherein a result of said adjusting said score of said UIAM item of said second set of said one or more UIAM items is said score of said UIAM item being included in said top k scores, and wherein said automatically generating said one or more reports is based in part on said score of said UIAM item of said second set of one or more UIAM items being included in said top k scores.

12. The program product of claim 11, wherein said method further comprises:
   determining a score of another UIAM item of said one or more other UIAM items is a predetermined value indicating an outdated UIAM item that represents an outdated interest of said user; and
   in response to said determining said score of said another UIAM item of said one or more other UIAM items is said predetermined value indicating said outdated UIAM item, deleting said another UIAM item of said one or more other UIAM items from said cube-based UIAM.

13. The program product of claim 11, wherein said M, N and W are positive integers, wherein N>M, and wherein M>W.

14. The program product of claim 10, wherein said method further comprises:
   prior to said constructing said cube-based UIAM, generating a first set of one or more Multidimensional Expressions (MDX) queries from said BI application based on said initial user visit(s), wherein said constructing said cube-based UIAM is further based on information included in said first set of one or more MDX queries; and
   in response to said detecting said subsequent user visit(s), generating a second set of one or more MDX queries, wherein said generating said second set of one or more UIAM items based on said subsequent user visit(s) is further based on information included in said second set of one or more MDX queries.

15. The program product of claim 10, wherein said method further comprises:
   subsequent to said automatically generating one or more reports representative of said user interest(s) in said first and second sets of user interest(s) corresponding to said top k scores instead of user interest(s) only in said first set of user interest(s), receiving a selection by said user of a report of said one or more reports, said report associated with a UIAM item of said multiple UIAM items included in said updated cube-based UIAM;
   based on said receiving said selection of said report, generating a MDX query based on said selection of said report; and
   responsive to said generating said MDX query, updating said cube-based UIAM again by adding M to said score of said UIAM item of said multiple UIAM items and subtracting W from one or more scores of one or more UIAM items of said multiple UIAM items that are other than said UIAM item.

16. The program product of claim 10, wherein said method further comprises:
   subsequent to said automatically generating one or more reports representative of said user interest(s) in said first and second sets of user interest(s) corresponding to said top k scores instead of user interest(s) only in said first set of user interest(s), receiving a selection by said user of another report not included in said one or more reports;
   based on said receiving said selection of said another report, generating a MDX query based on said selection of said another report; and
   responsive to said generating said another MDX query, updating said cube-based UIAM by adding M to a score of a UIAM item representing an interest of said user in said report if said UIAM item is already in said cube-based UIAM or assigning a default score of N to said UIAM item if said UIAM item is not already in said cube-based UIAM, and by subtracting W from score(s) of one or more UIAM items of said multiple UIAM items that are different from said UIAM item.

17. The program product of claim 10, wherein said method further comprises:
   constructing and storing a user group interest analytic model (UGIAM) by including UIAM items associated with multiple users who utilize said BI application and belong to a user group, said UIAM items based on initial visits of said multiple users to said BI application, wherein said multiple users includes said user, and wherein said UIAM items include said first set of one or more UIAM items;
   updating said UGIAM based on updates of said UIAM items associated with said multiple users belonging to said user group, said updates of said UIAM items based on subsequent visits of said multiple users to said BI application, wherein said updating said UGIAM includes adjusting scores of said UIAM items associated with said multiple users belonging to said user group; and
   automatically generating reports based on top K scores of said adjusted scores of said UIAM items associated with said multiple users belonging to said user group, wherein K is a positive integer.

18. The program product of claim 17, wherein said method further comprises:
   determining matching levels of said UIAM items, each matching level indicating whether said an interest represented by a corresponding UIAM item of said UIAM items is common among interests of said multiple users belonging to said user group according to predefined criteria; and
   distributing said generated reports to one or more users of said multiple users, said distributing based on said matching levels.

19. A process for supporting computing infrastructure, said process comprising providing at least one support service for at least one of creating, integrating, hosting, maintaining, and deploying computer-readable code in a computer system comprising a processor, wherein said processor carries out instructions contained in said code causing said computer system to perform a method of automatically generating reports matching user interests represented in a dynamically adjusted user interest analytic model, wherein said method comprises:
   said computer system constructing a first user interest analytic model (cube-based UIAM) by including in a first set of one or more UIAM items a representation of a first set of one or more interests (first set of user interest(s)) of a user, said constructing said cube-based UIAM being based on one or more initial visits (initial user visit(s)) of said user to a business intelligence (BI) application;
   said computer system storing said cube-based UIAM in a data structure that is an online analytical processing (OLAP) multidimensional cube;
   said computer system transforming said cube-based UIAM stored in said cube into a second UIAM (data warehouse-based UIAM) stored in a data warehouse based on tables in said data warehouse;

said computer system storing said data warehouse-based UIAM in said tables in said data warehouse;

said computer system detecting one or more subsequent visits (subsequent user visit(s)) of said user to said BI application;

responsive to said detecting said subsequent user visit(s), said computer system updating said cube-based UIAM and said data warehouse-based UIAM with a representation of a second set of one or more interests (second set of user interest(s)) of said user, wherein said second set of user interest(s) is different from said first set of user interest(s), wherein said updating said cube-based UIAM and said data warehouse-based UIAM includes generating a second set of one or more UIAM items based on said subsequent user visit(s), and adjusting scores of multiple UIAM items that include said first set of one or more UIAM items and said second set of one or more UIAM items;

subsequent to said updating said cube-based UIAM and said data warehouse-based UIAM, said computer system detecting an update of data in said data warehouse; and responsive to said detecting said update of said data in said data warehouse, based on top k scores of said adjusted scores of said multiple UIAM items, and further based on said updated cube-based UIAM and said updated data warehouse-based UIAM, said computer system automatically generating one or more reports representative of user interest(s) in said first and second sets of user interest(s) corresponding to said top k scores instead of user interest(s) only in said first set of user interest(s), wherein k is a positive integer.

20. The process of claim 19, wherein said adjusting said scores of said multiple UIAM items includes adjusting a score of a UIAM item of said second set of one or more UIAM items, said score of said UIAM item indicating a latest interest of said user, wherein said adjusting said score includes:

said computer system adding M to a score of said UIAM item of said second set of one or more UIAM items if said UIAM item is already included in said cube-based UIAM;

said computer system adding said UIAM item of said second set of one or more UIAM items as a new record in said cube-based UIAM and assigning a default score of N as said score of said UIAM item if said UIAM item does not already exist in said cube-based UIAM; and said computer system subtracting W from score(s) of one or more other UIAM item of said multiple UIAM items in said cube-based UIAM, wherein said one or more other UIAM items are other than said UIAM item, wherein said subtracting W from said score(s) of said one or more other UIAM items includes subtracting W from a score of at least one UIAM item of said first set of one or more UIAM items that is different from said UIAM item of said second set of one or more UIAM items, wherein a result of said adjusting said score of said UIAM item of said second set of said one or more UIAM items is said score of said UIAM item being included in said top k scores, and wherein said automatically generating said one or more reports is based in part on said score of said UIAM item of said second set of one or more UIAM items being included in said top k scores.

21. The process of claim 20, wherein said method further comprises:

determining a score of another UIAM item of said one or more other UIAM items is a predetermined value indicating an outdated UIAM item that represents an outdated interest of said user; and in response to said determining said score of said another UIAM item of said one or more other UIAM items is said predetermined value indicating said outdated UIAM item, said computer system deleting said another UIAM item of said one or more other UIAM items from said cube-based UIAM.

22. The process of claim 20, wherein said M, N and W are positive integers, wherein N>M, and wherein M>W.

23. The process of claim 19, wherein said method further comprises:

prior to said constructing said cube-based UIAM, said computer system generating a first set of one or more Multidimensional Expressions (MDX) queries from said BI application based on said initial user visit(s), wherein said constructing said cube-based UIAM is further based on information included in said first set of one or more MDX queries; and in response to said detecting said subsequent user visit(s), generating a second set of one or more MDX queries, wherein said generating said second set of one or more UIAM items based on said subsequent user visit(s) is further based on information included in said second set of one or more MDX queries.

24. A computer-implemented method of representing user interests in a cube-based user interest analytic model, said method comprising:

a computer system representing said user interests of a user with a specification of a sub-cube of a cube, an analysis of said sub-cube, user information, and user group information in said cube-based user interest analytic model (UIAM), wherein said sub-cube describes a data set associated with behavior of said user of a business intelligence (BI) application, said behavior indicating said user interests, wherein said specification of said sub-cube includes an axis of said cube, levels and member sets of said axis, calculations on said axis, an identification of said cube, and an analysis of properties for each pair of a metric in which said user is interested and a dimension in which said user is interested, wherein said properties include a maximum value of said metric in which said user is interested, a maximum deviation that indicates a significant deviation from an average of said metric in which said user is interested, a minimum value of said metric in which said user is interested, a deviation that is significant based on a comparison of metrics, and a specific data value set of said dimension, wherein said analysis of said sub-cube includes a data level change of said axis in said sub-cube that indicates said user has drilled up or drilled down from an axis to view additional detail or conclusion data, wherein said analysis of said sub-cube further includes a member set change of said axis in said sub-cube that indicates said user has used filters to filter out data in said cube, wherein said analysis of said sub-cube further includes calculation changes of axes of said cube that indicate said user has changed a calculation of said cube, wherein said user information includes a user identification that identifies said user based on a logon to said BI application by said user, and wherein said user group information includes a user group identification that identifies a group that includes said user who logged onto said BI application;

said computer system receiving a Multidimensional Expressions (MDX) query from said BI application based on a visit (user visit) of a user to said BI application;

said computer system extracting said specification of said sub-cube, said analysis of said sub-cube, said user information, and said user group information from said MDX query; and storing said specification of said sub-cube, said analysis of said sub-cube, said user information, and said user group information in said cube-based UIAM; and automatically generating one or more reports representative of interests of said user, said interests based on said cube-based UIAM.

25. A computer-implemented method of representing user interests in a data warehouse-based user interest analytic model, said method comprising:

a computer system representing, in said data warehouse-based user interest analytic model (UIAM), said user interests with a fact table having fact table columns, a dimension table having dimension table columns, combinations of dimension table columns, combinations of fact table columns, an analysis of properties for pairs of columns, scores of UIAM items included in said data warehouse-based UIAM, and matching level values, wherein each pair of columns includes a fact table column of said fact table columns and a dimension table column of said dimension table columns, said user interests being interests of a user of a business intelligence (BI) application, wherein said fact table columns indicate said user interests, wherein said dimension table columns indicate metrics associated with said user interests, wherein said combinations of dimension table columns indicate other metrics associated with said user interests, wherein said combinations of fact table columns indicate a comparison among said metrics associated with said user interests, wherein properties for each pair of columns includes a maximum value of data in which said user is interested, a maximum deviation that indicates a significant deviation from an average of said data in which said user is interested, a minimum value of said data in which said user is interested, a deviation that is significant based on a comparison between two fact table columns of said fact table columns, and a specific data value set of said dimension table, wherein each score of said scores is assigned to a corresponding UIAM item of said UIAM items and indicates a level of interest of said user, said interest of said user being represented by said corresponding UIAM item, and said level of interest being dynamically adjusted based on visits to said BI application by said user, and wherein a matching level value of said matching level values for said metrics associated with said user interests indicates whether a user interest of said user interests of said user is common among other users included in a group that includes said user; and automatically generating one or more reports representative of said user interests as represented in said data warehouse-based UIAM.

* * * * *